(12) United States Patent
Ma et al.

(10) Patent No.: US 12,738,839 B2
(45) Date of Patent: Sep. 15, 2026

(54) POWER SUPPLY VOLTAGE CONTROL METHOD AND APPARATUS, BLOCKCHAIN SERVER, AND STORAGE MEDIUM

(71) Applicant: SHENZHEN MICROBT ELECTRONICS TECHNOLOGY CO., LTD., Guangdong (CN)

(72) Inventors: Weibin Ma, Guangdong (CN); Haifeng Guo, Guangdong (CN); Yuefeng Wu, Guangdong (CN); Lihong Huang, Guangdong (CN); Zuoxing Yang, Guangdong (CN)

(73) Assignee: SHENZHEN MICROBT ELECTRONICS TECHNOLOGY CO., LTD., Guangdong (CN)

( * ) Notice: Subject to any disclaimer, the term of this patent is extended or adjusted under 35 U.S.C. 154(b) by 256 days.

(21) Appl. No.: 18/270,526

(22) PCT Filed: Feb. 20, 2023

(86) PCT No.: PCT/CN2023/077091
§ 371 (c)(1),
(2) Date: Jun. 30, 2023

(87) PCT Pub. No.: WO2024/040887
PCT Pub. Date: Feb. 29, 2024

(65) Prior Publication Data

US 2024/0388201 A1 Nov. 21, 2024

(30) Foreign Application Priority Data

Aug. 25, 2022 (CN) ........................ 202211023509.9

(51) Int. Cl.
*H02M 3/04* (2006.01)

(52) U.S. Cl.
CPC .................................... *H02M 3/04* (2013.01)

(58) Field of Classification Search
CPC ...................................................... H02M 3/04
See application file for complete search history.

(56) References Cited

U.S. PATENT DOCUMENTS 7,679,214 B2 * 3/2010 Nakamura ................ G06F 1/26 307/43
9,645,590 B1 5/2017 Fung et al.
(Continued)

FOREIGN PATENT DOCUMENTS

CN 103529922 A 1/2014
CN 103529992 A 1/2014
(Continued)

OTHER PUBLICATIONS

International Search Report and Written Opinion for PCT/CN2022/070473 dated May 5, 2023 (10 pages).
(Continued)

*Primary Examiner* — Jaweed A Abbaszadeh
*Assistant Examiner* — Ayman Fatima
(74) *Attorney, Agent, or Firm* — Merchant & Gould P.C.

(57) ABSTRACT

Embodiments of this application provide a power supply voltage control method and apparatus, a blockchain server, and a storage medium. The method includes: determining a voltage determination parameter based on a ratio of a first value to a second value, where the first value is a number of cores in an operating state in a blockchain server, and the second value is a total number of cores in the blockchain server; determining a target voltage value of a power supply of the blockchain server based on the voltage determination parameter; and controlling a value of an output voltage of the power supply to be the target voltage value.

14 Claims, 4 Drawing Sheets

(56) References Cited

U.S. PATENT DOCUMENTS

| | | | |
|---|---|---|---|
| 11,296,866 B2 | 4/2022 | Rodriguez De Castro et al. | |
| 11,340,646 B1 | 5/2022 | Huang et al. | |
| 11,493,981 B1 | 11/2022 | Ma et al. | |
| 11,644,798 B2 * | 5/2023 | Perenzoni | G04F 10/005 341/166 |
| 2005/0264347 A1 | 12/2005 | Gyohten et al. | |
| 2007/0147097 A1 * | 6/2007 | Huang | H02M 1/32 363/55 |
| 2016/0246343 A1 | 8/2016 | Pagarkar et al. | |
| 2017/0068309 A1 * | 3/2017 | Toosizadeh | G06F 1/3296 |
| 2018/0081382 A1 | 3/2018 | Tsao et al. | |
| 2018/0365178 A1 * | 12/2018 | Kubo | G05F 1/12 |
| 2020/0132737 A1 | 4/2020 | De Hoog et al. | |
| 2020/0409450 A1 * | 12/2020 | Hovis | G06F 1/3296 |
| 2021/0028983 A1 | 1/2021 | Balakrishnan | |
| 2022/0222112 A1 | 7/2022 | Dibbad et al. | |
| 2022/0374063 A1 | 11/2022 | Ma et al. | |
| 2022/0413720 A1 * | 12/2022 | Purandare | G06F 3/0625 |
| 2023/0078250 A1 | 3/2023 | Ma et al. | |
| 2023/0123281 A1 | 4/2023 | Liu et al. | |

FOREIGN PATENT DOCUMENTS

| | | |
|---|---|---|
| CN | 105677000 A | 6/2016 |
| CN | 108170257 A | 6/2018 |
| CN | 207531168 U | 6/2018 |
| CN | 108446004 A | 8/2018 |
| CN | 207976832 U | 10/2018 |
| CN | 108762460 A | 11/2018 |
| CN | 110825208 A | 2/2020 |
| CN | 112558507 A | 3/2020 |
| CN | 2022081596 A1 | 4/2020 |
| CN | 111506154 A | 8/2020 |
| CN | 111538382 A | 8/2020 |
| CN | 111736059 A | 10/2020 |
| CN | 111752361 A | 10/2020 |
| CN | 111781985 A | 10/2020 |
| CN | 111796651 A | 10/2020 |
| CN | 111859829 A | 10/2020 |
| CN | 111966202 A | 11/2020 |
| CN | 111966409 A | 11/2020 |
| CN | 112445302 A | 3/2021 |
| CN | 213182661 U | 5/2021 |
| CN | 113359935 A | 9/2021 |
| CN | 113597627 A | 11/2021 |
| CN | 3176930 A1 | 2/2022 |
| CN | 114384980 A | 4/2022 |
| CN | 115113675 A | 9/2022 |
| WO | 2022081596 A1 | 4/2020 |
| WO | 2022022403 A1 | 2/2022 |

OTHER PUBLICATIONS

First Chinese Office Action for Application No. 2022110235099 (14 pages including English Translation).

First Search Report for Application No. 2022110235099 (4 pages).

Supplementary Search Report for Application No. 2022110235099 (1 pages).

Notification to Grant Patent Right for Invention for Application No. 2022110235099 (3 pages with English Translation).

* cited by examiner

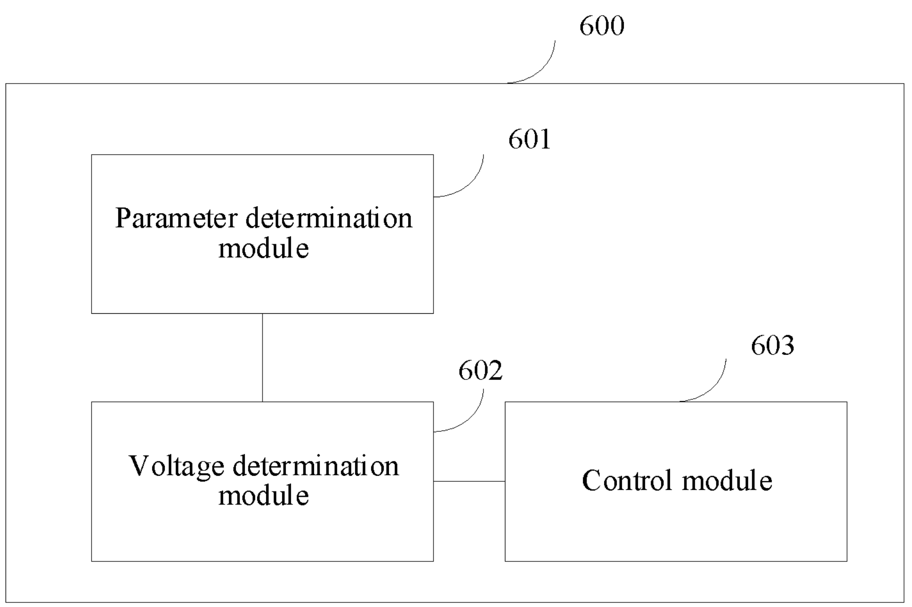
FIG. 6
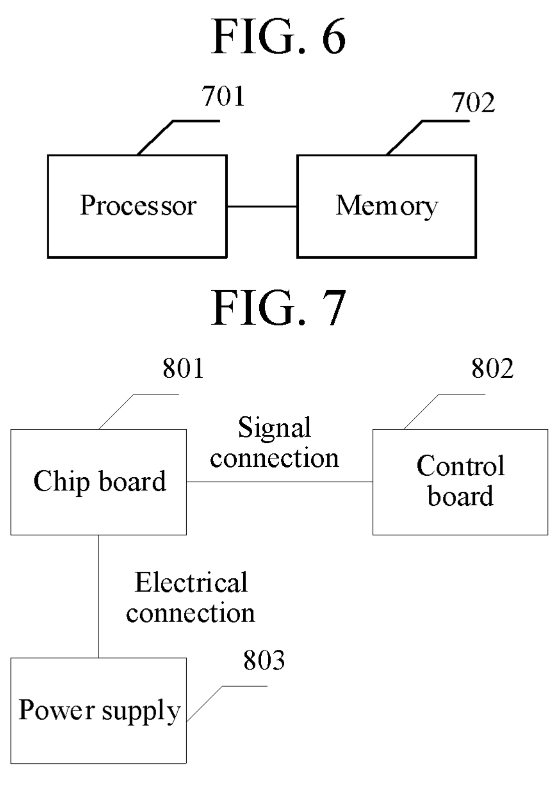
FIG. 7
FIG. 8

POWER SUPPLY VOLTAGE CONTROL METHOD AND APPARATUS, BLOCKCHAIN SERVER, AND STORAGE MEDIUM

CROSS-REFERENCE TO RELATED APPLICATIONS

The present application is a National Stage Entry of International application No. PCT/CN2023/077091 filed on Feb. 20, 2023, which claims the priority to Chinese Patent Application No. 202211023509.9, filed on Aug. 25, 2022 and entitled "POWER SUPPLY VOLTAGE CONTROL METHOD AND APPARATUS, BLOCKCHAIN SERVER, AND STORAGE MEDIUM", which is incorporated in its entirety herein by reference.

TECHNICAL FIELD

This application belongs to the field of blockchain technologies, and in particular, to a power supply voltage control method and apparatus, a blockchain server, and a storage medium.

BACKGROUND

Generally, a blockchain technology is a new distributed infrastructure and computing method, which uses a blockchain data structure to verify and store data, uses a distributed node consensus algorithm to generate and update data, uses cryptography to ensure security of data transmission and access, and uses smart contracts composed of automated script code to program and operate data. A blockchain network is a decentralized network, which is a peer-to-peer (P2P) network. There is no centralized service and hierarchy in the blockchain network. All nodes are equal, and the nodes provide network services together. The nodes in the blockchain network are both clients and servers.

In the prior art, when a blockchain server is running normally, an output voltage of a power supply of the blockchain server is usually maintained at a preset fixed voltage value, and no optimization mechanism is provided for the output voltage of the power supply. However, if the output voltage of the power supply is excessively high, a waste of power consumption is caused, and if the output voltage of the power supply is excessively low, the computing power and stability of the blockchain server may be affected.

SUMMARY

Embodiments of this application provide a power supply voltage control method and apparatus, a blockchain server, and a storage medium.

According to an aspect, an embodiment of this application provides a power supply voltage control method, comprising: determining a voltage determination parameter based on a ratio of a first value to a second value, wherein the first value is a number of cores in an operating state in a blockchain server, and the second value is a total number of cores in the blockchain server; determining a target voltage value of a power supply of the blockchain server based on the voltage determination parameter; and controlling a value of an output voltage of the power supply to be the target voltage value.

According to another aspect, an embodiment of this application provides a power supply voltage control apparatus, comprising: a parameter determination module, configured to determine a voltage determination parameter based on a ratio of a first value to a second value, wherein the first value is a number of cores in an operating state in a blockchain server, and the second value is a total number of cores in the blockchain server; a voltage determination module, configured to determine a target voltage value of a power supply of the blockchain server based on the voltage determination parameter; and a control module, configured to control a value of an output voltage of the power supply to be the target voltage value.

According to another aspect, an embodiment of this application provides a blockchain server, comprising: a chip board, comprising a plurality of chips, wherein each of the chips comprises at least one core; and a control board, comprising a memory and a processor, wherein the memory stores an application that, when executed by the processor, implements the power supply voltage control method described above; and wherein the chip board forms a signal connection to the control board through a signal connection interface, and the chip board forms an electrical connection to the power supply through a power connection interface.

According to another aspect, an embodiment of this application provides a computer-readable storage medium having computer-readable instructions stored thereon, wherein the computer-readable instructions is used for performing the power supply voltage control method described above.

BRIEF DESCRIPTION OF THE DRAWINGS

FIG. 6 is an exemplary structural diagram of a power supply voltage control apparatus according to an embodiment of this application.

FIG. 7 is an exemplary structural diagram of a power supply voltage control apparatus according to another embodiment of this application.

FIG. 8 is an exemplary structural diagram of a blockchain server according to an embodiment of this application.

DETAILED DESCRIPTION

In order to make the objectives, technical solutions, and advantages of this application clearer, this application is described in further detail below with reference to the drawings.

For concise and intuitive descriptions, solutions of this application are stated below by describing several representative embodiments. A large amount of details in the embodiments are merely used for helping understand the solutions of this application. However, obviously, implementation of the technical solutions of this application may not be limited to these details. To avoid unnecessarily blurring the solutions of this application, some embodiments are not described in detail, but only frames are provided. In the following, "include" means "include, but is not limited to", and "according to" means "at least according to, but not limited to only according to". Because of language habits, if the number of a component is not particularly specified in the following, it means that the number of the component may be one or more, or may be understood as at least one.

The applicant found that in the prior art, an output voltage of a power supply of a blockchain server is usually maintained at a preset fixed voltage value. This has at least the following disadvantages: if the fixed voltage value is excessively high, a waste of power consumption is caused, and if the fixed voltage value is excessively low, the computing power and stability of the blockchain server may be affected. Therefore, maintaining the output voltage of the power supply at a target voltage value that can not only ensure the computing power and stability but also reduce the power consumption is an urgently needed technical means.

Figure 1:
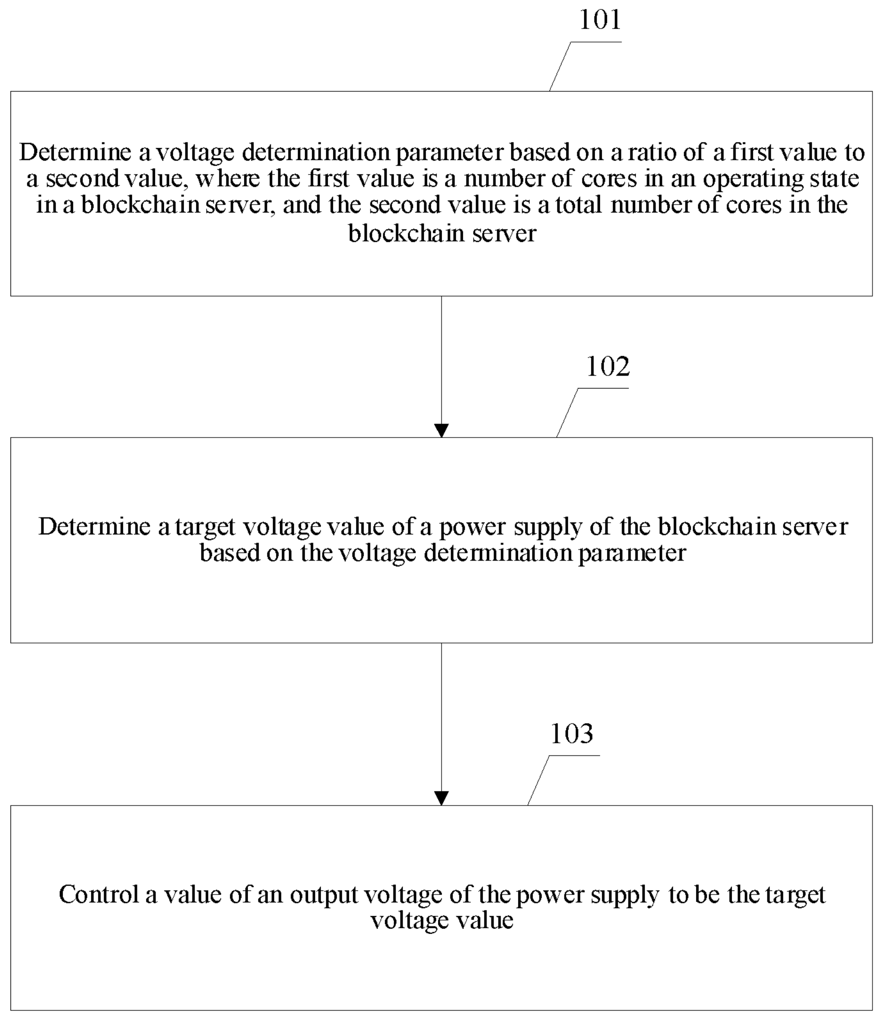
FIG. 1 is an exemplary flowchart of a power supply voltage control method according to an embodiment of this application.

Based on the above analysis, FIG. 1 is an exemplary flowchart of a power supply voltage control method according to an embodiment of this application.

As shown in FIG. 1, the method includes the following steps:

Step 101: Determine a voltage determination parameter based on a ratio of a first value to a second value, where the first value is a number of cores in an operating state in a blockchain server, and the second value is a total number of cores in the blockchain server.

In this step, the voltage determination parameter is a parameter used for subsequently determining a target voltage value of a power supply of the blockchain server.

In an embodiment, the method further includes: determining the second value based on a number of chips in the blockchain server and a number of cores included in each of the chips.

In an embodiment, the method further includes: transmitting computing tasks to all cores in the blockchain server, respectively; counting cores that execute the computing tasks to return a specified random number; and determining a number of the counted cores as the first value.

The specified random number may be any random number that is used only once or a non-repeated random number, which is specifically a random number that meets the difficulty requirements of Nonce. For example, the returned result is Nonce (full name: number used once or number once), the returned Nonce meets the difficulty requirements of virtual currency mining, wherein each Nonce is a result of traversal performed by the core.

For example, if the blockchain server includes 300 chips of the same type, and each of the chips includes 600 cores, the second value is 300*600=180000. That is to say, there are 180000 cores in total.

Once the blockchain server is started up, the blockchain server first goes through a frequency up-conversion stage, and then enters an operating state in which a chip frequency remains unchanged. The computing tasks are transmitted to all cores in the operating state in the blockchain server, respectively. Then the cores that execute the computing tasks to return Nonce are counted, and the number of the cores that execute the computing tasks to return Nonce is determined as the first value. For example, if a control board in the blockchain server transmits computing tasks to 180000 cores, respectively, and counts 170000 cores that execute the computing tasks to return Nonce, the number of cores in the operating state in the blockchain server is 170000. That is to say, the first value is 170000.

In an embodiment, the ratio of the first value to the second value may be determined as the voltage determination parameter. In this case, the voltage determination parameter is a ratio of the number of cores in the operating state in the blockchain server to the total number of cores in the blockchain server. That is to say, voltage determination parameter=number of cores in the operating state in the blockchain server/total number of cores in the blockchain server. For example, the first value is 170000, the second value is 180000, and the voltage determination parameter=170000/180000=0.944.

In another embodiment, the ratio of the first value to the second value is used as a computation factor, and a mathematical operation (such as multiplying by a fixed coefficient or dividing by a fixed coefficient, etc.) is performed on the calculation factor to determine the voltage determination parameter.

In the operating state of the blockchain server, the second value is usually fixed, and the first value may vary. A real-time ratio of the first value to the second value may be continuously detected as a real-time value of the voltage determination parameter.

The above exemplarily describes the typical examples of determining the first value, the second value, and the voltage determination parameter. A person skilled in the art can realize that the description is merely exemplary and is not intended to limit the scope of protection of the implementations of this application.

Step 102: Determine a target voltage value of a power supply of the blockchain server based on the voltage determination parameter.

The target voltage value is an ideal value of an output voltage of the power supply of the blockchain server. The target voltage value can ensure the computing power and stability, and can reduce the power consumption.

After a lot of research, the applicant determines that a mapping relationship exists between the voltage determination parameter and a power supply voltage of the blockchain server. Moreover, the mapping relationship between the voltage determination parameter and the power supply voltage varies when the blockchain server includes a latch chip or a non-latch chip. A latch is a unit sensitive to an input signal level in an asynchronous sequential circuit system and configured to store information. When data is not latched, a signal at an output terminal of the latch varies with an input signal, as if a signal passes through a buffer. Once a latch signal becomes valid, and the data is latched, the input signal is disabled. When the blockchain server uses the non-latch chip, a chip leakage problem can usually be overcome. When the blockchain server uses the latch chip, the chip leakage problem usually exists.

Figure 2:
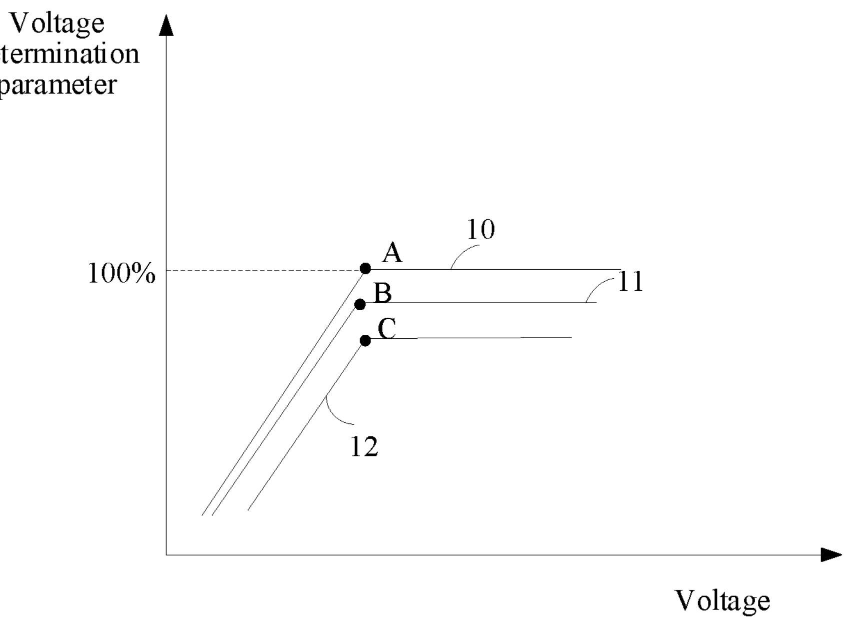
FIG. 2 is a schematic diagram of a mapping relationship between a power supply voltage and a voltage determination parameter of a blockchain server including a non-latch chip according to an embodiment of this application.

FIG. 2 is a schematic diagram of a mapping relationship between a power supply voltage and a voltage determination parameter of a blockchain server including a non-latch chip according to an embodiment of this application.

A blockchain server 10, a blockchain server 11, and a blockchain server 12 respectively use different specifications of non-latch chips, and each of the blockchain server 10, the blockchain server 11, and the blockchain server 12 is in the operating state (in which chip frequency remains unchanged) after the frequency up-conversion stage. It may be learned that when the power supply voltage is small, voltage determination parameters of the blockchain server

10, the blockchain server 11, and the blockchain server 12 increase with an increase of the power supply voltages. The increase may specifically be linear or nonlinear increase, which is not limited in this embodiment of this application.

In FIG. 2, when the power supply voltage is increased to be greater than a point A, the voltage determination parameter of the blockchain server 10 will no longer increase with the increase of the power supply voltage, but remain unchanged. When the power supply voltage is increased to be greater than a point B, the voltage determination parameter of the blockchain server 11 will no longer increase with the increase of the power supply voltage, but remain unchanged. When the power supply voltage is increased to be greater than a point C, the voltage determination parameter of the blockchain server 12 will no longer increase with the increase of the power supply voltage, but remain unchanged.

Therefore, the power supply voltage at the point A is the target voltage of the blockchain server 10, the power supply voltage at the point B is the target voltage of the blockchain server 11, and the power supply voltage at the point C is the target voltage of the blockchain server 12.

Figure 3:
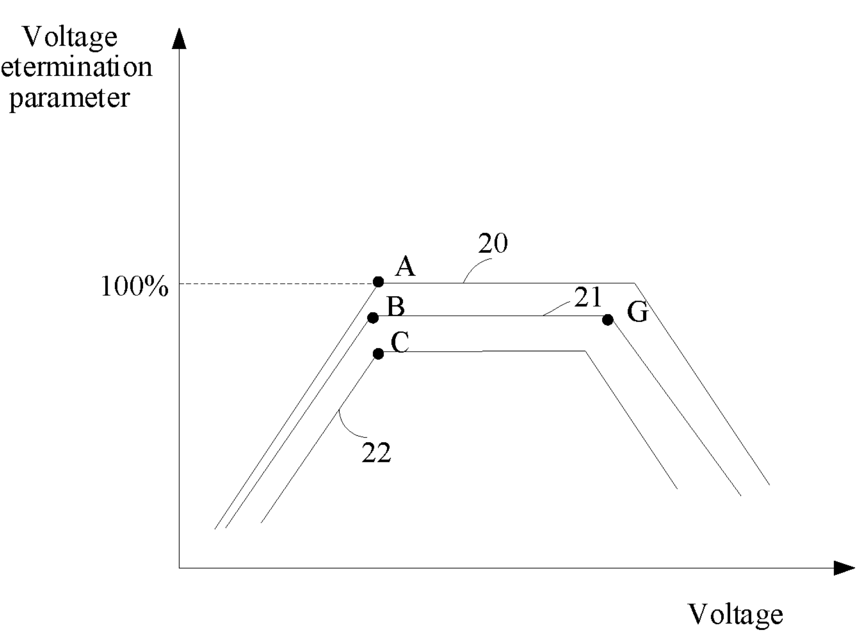
FIG. 3 is a schematic diagram of a mapping relationship between the power supply voltage and a voltage determination parameter of a blockchain server including a latch chip according to an embodiment of this application.

FIG. 3 is a schematic diagram of a mapping relationship between the power supply voltage and a voltage determination parameter of a blockchain server including a latch chip according to an embodiment of this application.

A blockchain server 20, a blockchain server 21, and a blockchain server 22 respectively use different specifications of latch chips, and each of the blockchain server 20, the blockchain server 21, and the blockchain server 22 is in the operating state (in which chip frequency remains unchanged) after the frequency up-conversion stage. It may be learned that when the power supply voltage is small, voltage determination parameters of the blockchain server 20, the blockchain server 21, and the blockchain server 22 increase with an increase of the power supply voltages. The increase may specifically be linear or nonlinear increase, which is not limited in this embodiment of this application.

When the power supply voltage is increased to be greater than a point A, the voltage determination parameter of the blockchain server 20 will no longer increase with the increase of the power supply voltage, but first remain unchanged and then decrease with the further increase of the power supply voltage. When the power supply voltage is increased to a point B, the voltage determination parameter of the blockchain server 21 will no longer increase with the increase of the power supply voltage, but first remain unchanged and then decrease with the further increase of the power supply voltage. When the power supply voltage is increased to a point C, the voltage determination parameter of the blockchain server 22 will no longer increase with the increase of the power supply voltage, but first remain unchanged and then decrease with the further increase of the power supply voltage.

Therefore, the power supply voltage at the point A is the target voltage of the blockchain server 20, the power supply voltage at the point B is the target voltage of the blockchain server 21, and the power supply voltage at the point C is the target voltage of the blockchain server 22.

In an embodiment, step 102 includes: gradually increasing a voltage value of the power supply with a predetermined voltage adjustment step (for example, 10 millivolts); gradually reducing the voltage value with the voltage adjustment step when the voltage value is increased until the voltage determination parameter remains unchanged or starts to decrease; and determining a result of summation of a current voltage value of the power supply and a single voltage adjustment step as the target voltage value when the voltage value is reduced until the voltage determination parameter starts to decrease. This embodiment is applicable to blockchain servers including non-latch chips or latch chips.

Example (1): The blockchain server includes a non-latch chip. The blockchain server 10 in FIG. 2 is used as an example for illustration. Regardless of the current voltage value of the power supply of the blockchain server 10, the voltage value of the power supply is gradually increased with a predetermined voltage adjustment step (for example, 10 millivolts). When the voltage value is increased until the voltage determination parameter remains unchanged (at this time, the voltage value may just reach the point A or have passed through the point A), the voltage value is gradually reduced with the voltage adjustment step. When the voltage value is reduced until the voltage determination parameter starts to decrease (at this time, the voltage value reaches a previous point of the point A), a result of summation of a current voltage value of the power supply and a single voltage adjustment step is determined as the target voltage value.

Example (2): The blockchain server includes a latch chip. The blockchain server 20 in FIG. 3 is used as an example for illustration. Regardless of the current voltage value of the power supply of the blockchain server 20, the voltage value of the power supply is gradually increased with a predetermined voltage adjustment step (for example, 10 millivolts). When the voltage value is increased until the voltage determination parameter remains unchanged (at this time, the voltage value may just reach the point A or have passed through the point A but not yet reached a falling range of the voltage determination parameter), the voltage value is gradually reduced with the voltage adjustment step. When the voltage value is reduced until the voltage determination parameter starts to decrease (at this time, the voltage value reaches a previous point of the point A), a result of summation of a current voltage value of the power supply and a single voltage adjustment step is determined as the target voltage value.

Example (3): The blockchain server includes a latch chip. The blockchain server 21 in FIG. 3 is used as an example for illustration. Regardless of the current voltage value of the power supply, the voltage value of the power supply is gradually increased with a predetermined voltage adjustment step (for example, 10 millivolts). When the voltage value is increased until the voltage determination parameter starts to decrease (at this time, the voltage value has reached a falling range of the voltage determination parameter, that is, has passed through a point G), the voltage value is gradually reduced with the voltage adjustment step. When the voltage value is reduced until the voltage determination parameter starts to decrease (the voltage determination parameter increases first, then remains unchanged, and finally starts to decrease), it is determined that the voltage value reaches a previous point of the point B, and a result of summation of a current voltage value of the power supply and a single voltage adjustment step is determined as the target voltage value.

Thus, in this embodiment of this application, the target voltage value is directly determined by an adjustment manner of increasing the voltage value of the power supply, which reduces the difficulty of determining the target voltage value.

Preferably, step 102 further includes: recording a maximum value of the voltage determination parameter of the blockchain server in a frequency up-conversion stage after startup; and determining the maximum value as the target value.

Subsequently, in this embodiment of this application, the voltage determination parameter is compared with the target value, which can simplify the determining process of the target voltage value.

Figure 4:
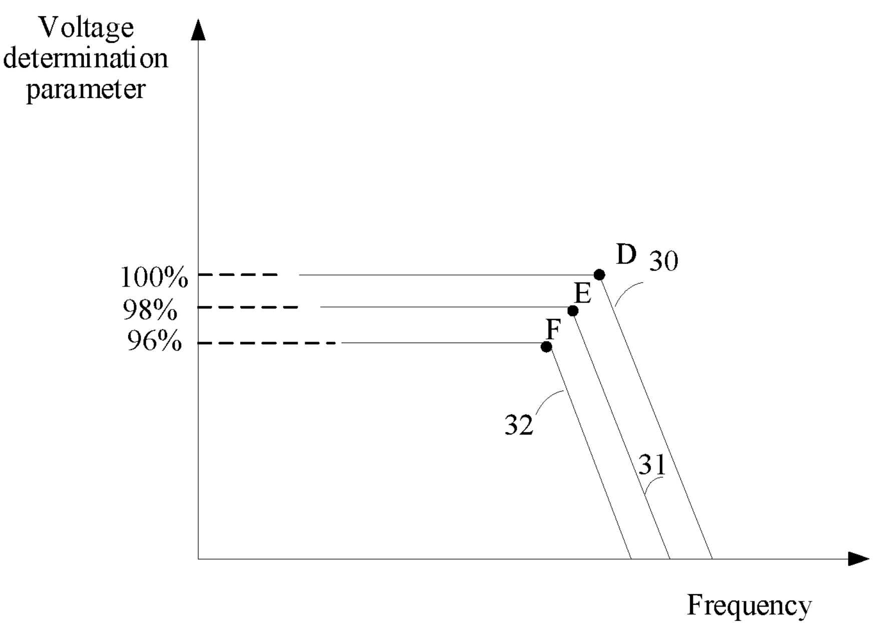
FIG. 4 is a schematic diagram of a mapping relationship between a chip frequency and the voltage determination parameter of the blockchain server including the non-latch chip according to an embodiment of this application.

FIG. 4 is a schematic diagram of a mapping relationship between a chip frequency and the voltage determination parameter of the blockchain server including the non-latch chip according to an embodiment of this application.

In FIG. 4, a blockchain server 30, a blockchain server 31, and a blockchain server 32 respectively use different specifications of non-latch chips, and each of the blockchain server 30, the blockchain server 31, and the blockchain server 32 is in the frequency up-conversion stage after startup (in which an output voltage of the power supply remains unchanged). It may be learned that when the chip frequency is small, voltage determination parameters of the blockchain server 30, the blockchain server 31, and the blockchain server 32 remain at maximum values. When the chip frequency continues to be increased to a point D, the voltage determination parameter of the blockchain server 30 will start to decrease. When the chip frequency is increased to a point E, the voltage determination parameter of the blockchain server 31 will start to decrease. When the chip frequency is increased to a point F, the voltage determination parameter of the blockchain server 32 will start to decrease.

Therefore, the voltage determination parameter at the point D is recorded as the maximum value of the voltage determination parameter in the frequency up-conversion stage after startup, that is, a target value for comparison with the voltage determination parameter for the blockchain server 30. The voltage determination parameter at the point E is recorded as the maximum value of the voltage determination parameter in the frequency up-conversion stage after startup, that is, a target value for comparison with the voltage determination parameter for the blockchain server 31. The voltage determination parameter at the point F is recorded as the maximum value of the voltage determination parameter in the frequency up-conversion stage after startup, that is, a target value for comparison with the voltage determination parameter for the blockchain server 32.

Figure 5:
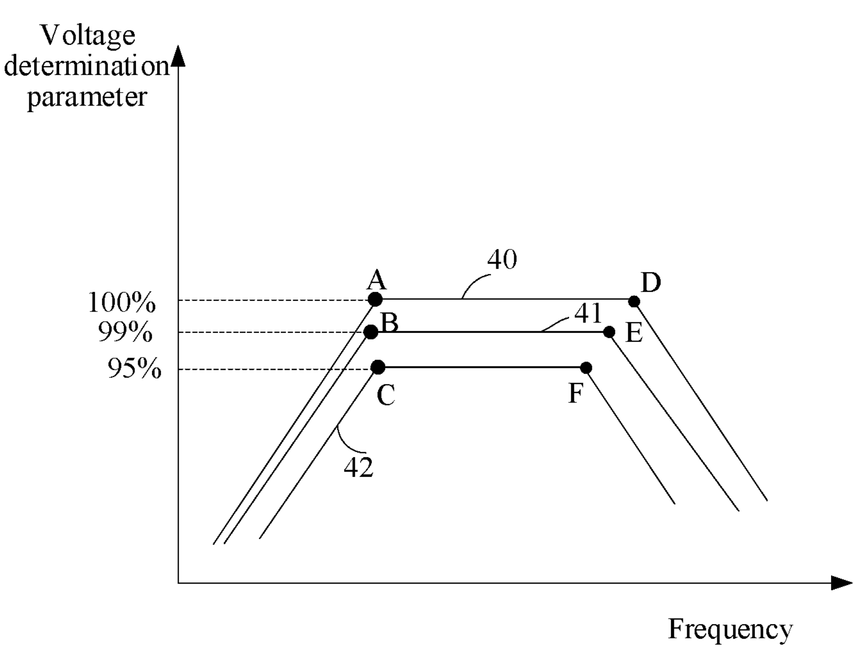
FIG. 5 is a schematic diagram of a mapping relationship between the chip frequency and the voltage determination parameter of the blockchain server including the latch chip according to an embodiment of this application.

FIG. 5 is a schematic diagram of a mapping relationship between the chip frequency and the voltage determination parameter of the blockchain server including the latch chip according to an embodiment of this application.

In FIG. 5, a blockchain server 40, a blockchain server 41, and a blockchain server 42 respectively use different specifications of latch chips, and each of the blockchain server 40, the blockchain server 41, and the blockchain server 42 is in the frequency up-conversion stage after startup (in which an output voltage of power supply remains unchanged). It may be learned that when the chip frequency is small, voltage determination parameters of the blockchain server 40, the blockchain server 41, and the blockchain server 42 increase with an increase of the chip frequency. The increase may be linear or nonlinear increase, which is not limited in this embodiment of this application.

When the chip frequency of the blockchain server 40 is increased to be greater than a point A, the voltage determination parameter of the blockchain server 40 will no longer increase with the increase of the chip frequency, but first remain unchanged in a range [A, D], and then decrease with the increase of the chip frequency after passing through the point D. When the chip frequency of the blockchain server 41 is increased to be greater than a point B, the voltage determination parameter of the blockchain server 41 will no longer increase with the increase of the chip frequency, but first remain unchanged in a range [B, E], and then decrease with the increase of the chip frequency after passing through the point E. When the chip frequency of the blockchain server 42 is increased to be greater than a point C, the voltage determination parameter of the blockchain server 42 will no longer increase with the increase of the chip frequency, but first remain unchanged in a range [C, F], and then decrease with the increase of the chip frequency after passing through the point F.

Therefore, the voltage determination parameter at the point D is recorded as the maximum value of the voltage determination parameter in the frequency up-conversion stage after startup, that is, a target value for comparison with the voltage determination parameter for the blockchain server 40. The voltage determination parameter at the point E is recorded as the maximum value of the voltage determination parameter in the frequency up-conversion stage after startup, that is, a target value for comparison with the voltage determination parameter for the blockchain server 41. The voltage determination parameter at the point F is recorded as the maximum value of the voltage determination parameter in the frequency up-conversion stage after startup, that is, a target value for comparison with the voltage determination parameter for the blockchain server 42.

The above describes in detail the specific method for determining the target value of the blockchain server. The following describes the specific process of determining the target voltage value based on the comparison between the voltage determination parameter and the target value.

In an embodiment, step 102 includes: gradually reducing a voltage value of the power supply with a predetermined voltage adjustment step when the voltage determination parameter is equal to a target value; and determining a result of summation of a current voltage value of the power supply and a single voltage adjustment step as the target voltage value when the voltage value is reduced until the voltage determination parameter starts to decrease. This embodiment is applicable to blockchain servers including non-latch chips or latch chips.

It may be learned that when the voltage determination parameter is equal to the target value, it may be determined that the voltage value may be slightly higher. Therefore, a voltage reduction regulation process is directly performed without performing a voltage increase regulation process.

Example (1): The blockchain server includes a non-latch chip. The blockchain server 10 in FIG. 2 is used as an example for illustration. If the current voltage determination parameter is equal to a target value, it may be determined that the current power supply voltage must be greater than or equal to the voltage at the point A. Therefore, a voltage reduction regulation process is directly performed. The voltage reduction regulation process specifically includes: gradually reducing a voltage value of the power supply with a voltage adjustment step (for example, 10 millivolts); and determining a result of summation of a current voltage value of the power supply and a single voltage adjustment step as the target voltage value when the voltage value is reduced until the voltage determination parameter starts to decrease (at this time, the voltage value reaches a previous point of the point A).

Example (2): The blockchain server includes a latch chip. The blockchain server 20 in FIG. 3 is used as an example for illustration. If the current voltage determination parameter is equal to a predetermined target value, it may be determined that the current voltage must be greater than or equal to the voltage at the point A. Therefore, a voltage reduction regulation process is directly performed. The voltage reduction regulation process specifically includes: gradually reducing the voltage value with a voltage adjustment step (for example, 10 millivolts); and determining the result of summation of the current voltage value of the power supply and a single voltage adjustment step as the target voltage value when the voltage value is reduced until the voltage determination parameter starts to decrease (at this time, the voltage value reaches a previous point of the point A).

In an embodiment, step 102 includes: gradually increasing a voltage value of the power supply with a predetermined voltage adjustment step when the voltage determination parameter is less than a predetermined target value; determining a result obtained by subtracting a single voltage adjustment step from a current voltage value of the power supply as the target voltage value when the voltage value is increased until the voltage determination parameter remains unchanged; and gradually reducing the voltage value with the voltage adjustment step when the voltage value is increased until the voltage determination parameter starts to decrease, and determining a result of summation of the current voltage value of the power supply and the single voltage adjustment step as the target voltage value when the voltage value is reduced until the voltage determination parameter first increases, then remains unchanged, and then starts to decrease.

It may be learned that when the voltage determination parameter is less than the predetermined target value, it may be determined that the current voltage value is in the falling or rising range of the voltage determination parameter, and is not in a constant range of the voltage determination parameter. Therefore, the target voltage value may be determined in a targeted way based on the falling or rising range. This embodiment is applicable to blockchain servers including non-latch chips or latch chips.

Example (1): The blockchain server includes a non-latch chip. The blockchain server 10 in FIG. 2 is used as an example for illustration. If the current voltage determination parameter is less than a predetermined target value, it may be determined that the current voltage must be less than the voltage at the point A. Therefore, a voltage increase regulation process is directly performed. The voltage increase regulation process specifically includes: gradually increasing a voltage value with a voltage adjustment step (for example, 10 millivolts); and determining a result obtained by subtracting a single voltage adjustment step from a current voltage value of the power supply as the target voltage value when the voltage value is increased until the voltage determination parameter remains unchanged (at this time, the voltage value reaches a next point of the point A).

Example (2): The blockchain server includes a latch chip. The blockchain server 21 in FIG. 3 is used as an example for illustration. If the current voltage determination parameter is less than a predetermined target value, it may be determined that the current voltage must be outside a range [B, G]. First, a voltage value of the power supply is gradually increased with a predetermined voltage adjustment step. When the voltage value is increased until the voltage determination parameter remains unchanged (that is, the voltage value reaches the range [B, G], and at this time, the voltage value reaches a next point of the point B), a result obtained by subtracting a single voltage adjustment step from a current voltage value of the power supply may be determined as the target voltage value. When the voltage value is increased until the voltage determination parameter starts to decrease (that is, the voltage value has passed through the point G), the voltage value is gradually reduced with the voltage adjustment step. When the voltage value is reduced until the voltage determination parameter first increases (that is, the voltage value returns to the point G), then remains unchanged (that is, the voltage value moves from the point G to the point B), and then starts to decrease (at this time, the voltage value reaches a previous point of the point B), a result of summation of a current voltage value of the power supply and the single voltage adjustment step is determined as the target voltage value.

Step 103: Control a value of an output voltage of the power supply to be the target voltage value.

Therefore, the power supply of the blockchain server can maintain the output voltage at the target voltage value, which can not only ensure the computing power and stability, but also reduce the power consumption.

FIG. 6 is an exemplary structural diagram of a power supply voltage control apparatus according to an embodiment of this application. As shown in FIG. 6, the power supply voltage control apparatus 600 includes:

a parameter determination module 601, configured to determine a voltage determination parameter based on a ratio of a first value to a second value, where the first value is a number of cores in an operating state in a blockchain server, and the second value is a total number of cores in the blockchain server;

a voltage determination module 602, configured to determine a target voltage value of a power supply of the blockchain server based on the voltage determination parameter;

a control module 603, configured to control a value of an output voltage of the power supply to be the target voltage value.

In an embodiment, the voltage determination module 602 is configured to: gradually increase a voltage value of the power supply with a predetermined voltage adjustment step; gradually reduce the voltage value with the voltage adjustment step when the voltage value is increased until the voltage determination parameter remains unchanged or starts to decrease; and determine a result of summation of a current voltage value of the power supply and a single voltage adjustment step as the target voltage value when the voltage value is reduced until the voltage determination parameter starts to decrease.

In an embodiment, the voltage determination module 602 is configured to: gradually reduce the voltage value of the power supply with a predetermined voltage adjustment step when the voltage determination parameter is equal to a predetermined target value; and determine a result of summation of a current voltage value of the power supply and a single voltage adjustment step as the target voltage value when the voltage value is reduced until the voltage determination parameter starts to decrease.

In an embodiment, the voltage determination module 602 is configured to: gradually increase the voltage value of the power supply with a predetermined voltage adjustment step when the voltage determination parameter is less than a predetermined target value; determine a result obtained by subtracting a single voltage adjustment step from a current voltage value of the power supply as the target voltage value when the voltage value is increased until the voltage determination parameter remains unchanged; and gradually reduce the voltage value with the voltage adjustment step when the voltage value is increased until the voltage determination parameter starts to decrease, and determine a result of summation of the current voltage value of the power supply and the single voltage adjustment step as the target voltage value when the voltage value is reduced until the voltage determination parameter first increases, then remains unchanged, and then starts to decrease.

In an embodiment, the voltage determination module 602 is further configured to: record a maximum value of the voltage determination parameter of the blockchain server in a frequency up-conversion stage after startup; and determine the maximum value as the target value.

In an embodiment, the parameter determination module 601 is further configured to determine the second value based on a number of chips in the blockchain server and a number of cores included in each of the chips.

In an embodiment, the parameter determination module 601 is further configured to: transmit computing tasks to all cores in the blockchain server, respectively; count cores that execute the computing tasks to return a specified random number; and determine a number of the counted cores as the first value.

FIG. 7 is an exemplary structural diagram of a power supply voltage control apparatus according to another embodiment of this application. A memory-processor architecture is arranged. As shown in FIG. 7, the power supply voltage control apparatus includes: a processor 701 and a memory 702. The memory 702 stores an application executable by the processor 701, to enable the processor 701 to perform the power supply voltage control method in the above embodiments.

The memory 702 may be specifically implemented as a plurality of storage media such as an electrically erasable programmable read-only memory (EEPROM), a flash memory, or a programmable read-only memory (PROM). The processor 701 may be implemented to include one or more central processing units or one or more field-programmable gate arrays. The field-programmable gate array integrates one or more central processing unit cores. Specifically, the central processing unit or the central processing unit core may be implemented as a CPU, an MCU, or a digital signal processor (DSP).

An embodiment of this application further provides a blockchain server. FIG. 8 is an exemplary structural diagram of a blockchain server according to an embodiment of this application. As shown in FIG. 8, the blockchain server includes:

a chip board 801, including a plurality of chips, where each of the chips includes at least one core; and a control board 802, including a memory and a processor. The memory stores an application that, when executed by the processor, implements the above power supply voltage control method. The chip board 801 forms a signal connection to the control board 802 through a signal connection interface, and the chip board 801 forms an electrical connection to a power supply 803 through a power connection interface.

It should be noted that not all steps and modules in the drawings of the procedures and the structures described above are necessary, and some steps or modules may be omitted according to actual needs. An execution sequence of the steps is not fixed and may be adjusted as required. Division of the modules is merely functional division for ease of description. During actual implementation, functions of one module may be implemented separately by a plurality of modules, and functions of the plurality of modules may be implemented by the same module. The modules may be located in the same device or in different devices.

Hardware modules in the embodiments may be implemented in a mechanic manner or an electronic manner. For example, a hardware module may include specially designed permanent circuits or logic devices (for example, an application-specific processor such as an FPGA or an ASIC) to complete specific operations. The hardware module may further include software temporarily configured programmable logic devices or circuits (for example, including a universal processor or other programmable processors) to perform specific operations. Whether the hardware module is specifically implemented in the mechanical manner, by using an application-specific permanent circuits, or by using a temporarily configured circuits (for example, configured by software) may be decided in consideration of costs and time.

This application further provides a computer-readable storage medium storing computer-readable instructions for enabling a machine to perform the method described in the above embodiments of this application. Specifically, a system or an apparatus that is equipped with a storage medium may be provided. The storage medium stores software program code that implements functions of any of the above embodiments, and a computer (a CPU or an MPU) of the system or the apparatus is enabled to read and execute the program code stored in the storage medium. In addition, program code-based instructions may also be used to enable an operating system or the like running in the computer to complete some or all actual operations. The program code read from the storage medium may also be written into a memory that is disposed in an expansion board inserted in the computer, or may be written into a memory that is disposed in an expansion unit connected to the computer, and then a CPU or the like that is installed on the expansion board or expansion unit may be enabled to execute some or all actual operations based on the instructions of the program code, so as to implement the functions of any of the above embodiments.

Embodiments of the storage medium for providing the program code may include a floppy disk, a hard disk, a magneto-optical disk, an optical disk (such as a CD-ROM, a CD-R, a CD-RW, a DVD-ROM, a DVD-RAM, a DVD-RW, and a DVD+RW), a magnetic tape, a non-volatile storage card, and a ROM. Optionally, the program code may be downloaded from a server computer or a cloud through a communication network.

The above is merely preferred embodiments of this application, and is not intended to limit the protection scope of this application. Any modification, equivalent replacement, or improvement made without departing from the spirit and principle of this application falls within the protection scope of this application.

What is claimed is:

1. A power supply voltage control method, comprising:

determining a voltage determination parameter based on a ratio of a first value to a second value, wherein the first value is a number of cores in an operating state in a blockchain server, and the second value is a total number of cores in the blockchain server;

determining a target voltage value of a power supply of the blockchain server based on the voltage determination parameter; and controlling a value of an output voltage of the power supply to be the target voltage value, wherein the determining the target voltage value of the power supply of the blockchain server based on the voltage determination parameter comprises:

gradually increasing a voltage value of the power supply with a predetermined uniform voltage adjustment step until the voltage determination parameter remains unchanged or starts to decrease; then gradually reducing the voltage value with the voltage adjustment step; and when the voltage determination parameter starts to decrease, determining a sum of the current voltage value of the power supply and one said voltage adjustment step as the target voltage value, or determining a maximum value of the voltage determination parameter of the blockchain server during a frequency up-conversion stage after startup as a predetermined target value; and gradually adjusting, based on a relative magnitude between the voltage determination parameter and the predetermined target value, the voltage value of the power supply with the voltage adjustment step to determine the target voltage value of the power supply of the blockchain server.

2. The method according to claim 1, wherein the determining the target voltage value of the power supply of the blockchain server based on the voltage determination parameter comprises:

gradually reducing the voltage value of the power supply with the voltage adjustment step when the voltage determination parameter is equal to the predetermined target value; and determining a result of summation of a current voltage value of the power supply and a single voltage adjustment step as the target voltage value when the voltage value is reduced until the voltage determination parameter starts to decrease.

3. The method according to claim 1, wherein the determining the target voltage value of the power supply of the blockchain server based on the voltage determination parameter comprises:

gradually increasing the voltage value of the power supply with the voltage adjustment step when the voltage determination parameter is less than the predetermined target value;

determining a result obtained by subtracting a single voltage adjustment step from a current voltage value of the power supply as the target voltage value when the voltage value is increased until the voltage determination parameter remains unchanged; and gradually reducing the voltage value with the voltage adjustment step when the voltage value is increased until the voltage determination parameter starts to decrease, and determining a result of summation of the current voltage value of the power supply and the single voltage adjustment step as the target voltage value when the voltage value is reduced until the voltage determination parameter first increases, then remains unchanged, and then starts to decrease.

4. The method according to claim 1, further comprising:

determining the second value based on a number of chips in the blockchain server and a number of cores included in each of the chips.

5. The method according to claim 1, further comprising:

transmitting computing tasks to all cores in the blockchain server, respectively;

counting cores that execute the computing tasks to return a specified random number; and determining a number of the counted cores as the first value.

6. A blockchain server, comprising:

a chip board, comprising a plurality of chips, wherein each of the chips comprises at least one core; and a control board, comprising a memory and a processor, wherein the memory stores an application that, when executed by the processor, implements a power supply voltage control method according to claim 1 comprising:

determining a voltage determination parameter based on a ratio of a first value to a second value, wherein the first value is a number of cores in an operating state in the blockchain server, and the second value is a total number of cores in the blockchain server;

determining a target voltage value of a power supply of the blockchain server based on the voltage determination parameter; and controlling a value of an output voltage of the power supply to be the target voltage value, wherein the determining the target voltage value of the power supply of the blockchain server based on the voltage determination parameter comprises:

gradually increasing a voltage value of the power supply with a predetermined uniform voltage adjustment step until the voltage determination parameter remains unchanged or starts to decrease; then gradually reducing the voltage value with the voltage adjustment step; and when the voltage determination parameter starts to decrease, determining a sum of the current voltage value of the power supply and one said voltage adjustment step as the target voltage value, or determining a maximum value of the voltage determination parameter of the blockchain server during a frequency up-conversion stage after startup as a predetermined target value; and gradually adjusting, based on a relative magnitude between the voltage determination parameter and the predetermined target value, the voltage value of the power supply with the voltage adjustment step to determine the target voltage value of the power supply of the blockchain server; and wherein the chip board forms a signal connection to the control board through a signal connection interface, and the chip board forms an electrical connection to the power supply through a power connection interface.

7. The blockchain server according to claim 6, wherein the determining the target voltage value of the power supply of the blockchain server based on the voltage determination parameter comprises:

gradually reducing the voltage value of the power supply with the voltage adjustment step when the voltage determination parameter is equal to the predetermined target value; and determining a result of summation of a current voltage value of the power supply and a single voltage adjustment step as the target voltage value when the voltage value is reduced until the voltage determination parameter starts to decrease.

8. The blockchain server according to claim 6, wherein the determining the target voltage value of the power supply of the blockchain server based on the voltage determination parameter comprises:

gradually increasing the voltage value of the power supply with the voltage adjustment step when the voltage determination parameter is less than the predetermined target value;

determining a result obtained by subtracting a single voltage adjustment step from a current voltage value of the power supply as the target voltage value when the voltage value is increased until the voltage determination parameter remains unchanged; and gradually reducing the voltage value with the voltage adjustment step when the voltage value is increased until the voltage determination parameter starts to decrease, and determining a result of summation of the current voltage value of the power supply and the single voltage adjustment step as the target voltage value when the voltage value is reduced until the voltage determination parameter first increases, then remains unchanged, and then starts to decrease.

9. The blockchain server according to claim 6, the method further comprising:

determining the second value based on a number of chips in the blockchain server and a number of cores included in each of the chips.

10. The blockchain server according to claim 6, the method further comprising:

transmitting computing tasks to all cores in the blockchain server, respectively;

counting cores that execute the computing tasks to return a specified random number; and determining a number of the counted cores as the first value.

11. A non-transitory computer-readable storage medium, storing computer-readable instructions, wherein the computer-readable instructions are used for performing a power supply voltage control method comprising:

determining a voltage determination parameter based on a ratio of a first value to a second value, wherein the first value is a number of cores in an operating state in a blockchain server, and the second value is a total number of cores in the blockchain server;

determining a target voltage value of a power supply of the blockchain server based on the voltage determination parameter; and controlling a value of an output voltage of the power supply to be the target voltage value, wherein the determining the target voltage value of the power supply of the blockchain server based on the voltage determination parameter comprises:

gradually increasing a voltage value of the power supply with a predetermined uniform voltage adjustment step until the voltage determination parameter remains unchanged or starts to decrease; then gradually reducing the voltage value with the voltage adjustment step; and when the voltage determination parameter starts to decrease, determining a sum of the current voltage value of the power supply and one said voltage adjustment step as the target voltage value, or determining a maximum value of the voltage determination parameter of the blockchain server during a frequency up-conversion stage after startup as a predetermined target value; and gradually adjusting, based on a relative magnitude between the voltage determination parameter and the predetermined target value, the voltage value of the power supply with the voltage adjustment step to determine the target voltage value of the power supply of the blockchain server.

12. The non-transitory computer-readable storage medium according to claim 11, wherein the determining the target voltage value of the power supply of the blockchain server based on the voltage determination parameter comprises:

gradually reducing the voltage value of the power supply with the voltage adjustment step when the voltage determination parameter is equal to the predetermined target value; and determining a result of summation of a current voltage value of the power supply and a single voltage adjustment step as the target voltage value when the voltage value is reduced until the voltage determination parameter starts to decrease.

13. The non-transitory computer-readable storage medium according to claim 11, wherein the determining the target voltage value of the power supply of the blockchain server based on the voltage determination parameter comprises:

gradually increasing the voltage value of the power supply with the voltage adjustment step when the voltage determination parameter is less than the predetermined target value;

determining a result obtained by subtracting a single voltage adjustment step from a current voltage value of the power supply as the target voltage value when the voltage value is increased until the voltage determination parameter remains unchanged; and gradually reducing the voltage value with the voltage adjustment step when the voltage value is increased until the voltage determination parameter starts to decrease, and determining a result of summation of the current voltage value of the power supply and the single voltage adjustment step as the target voltage value when the voltage value is reduced until the voltage determination parameter first increases, then remains unchanged, and then starts to decrease.

14. The non-transitory computer-readable storage medium according to claim 11, the method further comprising:

determining the second value based on a number of chips in the blockchain server and a numb of cores included in each of the chips.

* * * * *